US008299940B2

(12) United States Patent
Kinoshita

(10) Patent No.: US 8,299,940 B2
(45) Date of Patent: Oct. 30, 2012

(54) ROAD-VEHICLE COMMUNICATION SYSTEM AND VEHICLE-MOUNTED DEVICE

(75) Inventor: Yoshihito Kinoshita, Sagamihara (JP)

(73) Assignee: Kabushiki Kaisha Kenwood, Hacjiouji-shi, Tokyo (JP)

( * ) Notice: Subject to any disclaimer, the term of this patent is extended or adjusted under 35 U.S.C. 154(b) by 331 days.

(21) Appl. No.: 12/808,427

(22) PCT Filed: Dec. 19, 2008

(86) PCT No.: PCT/JP2008/073153

§ 371 (c)(1), (2), (4) Date: Jun. 16, 2010

(87) PCT Pub. No.: WO2009/081848

PCT Pub. Date: Jul. 2, 2009

(65) Prior Publication Data

US 2011/0102194 A1 May 5, 2011

(30) Foreign Application Priority Data

Dec. 21, 2007 (JP) ................................ 2007-330520

(51) Int. Cl.
*G08G 1/0967* (2006.01)

(52) U.S. Cl. .................... 340/905; 340/995.13; 701/400

(58) Field of Classification Search .................. 340/905, 340/995.1, 995.12, 995.13, 996, 901; 701/201, 701/400, 428, 441
See application file for complete search history.

(56) References Cited

U.S. PATENT DOCUMENTS 5,508,917 A * 4/1996 Siegle et al. .................. 701/428
5,819,198 A * 10/1998 Peretz .......................... 701/117
5,839,086 A * 11/1998 Hirano .......................... 701/420
6,466,862 B1 * 10/2002 DeKock et al. ............... 701/117
6,943,702 B2 * 9/2005 Kato ............................ 340/988
7,427,928 B2 * 9/2008 Crocker et al. ............... 340/902
8,165,748 B2 * 4/2012 Goto et al. ...................... 701/36

FOREIGN PATENT DOCUMENTS

JP 10-122870 5/1998

OTHER PUBLICATIONS

Written Notification of Reason for Refusal (Application No. 2007-330520) dated Nov. 22, 2011.
Notification of Transmittal of Translation of the International Preliminary Report on Patentability (Application No. PCT/JP2008/073153) dated Sep. 2, 2010.
International Search Report for Application Serial No. PCT/JP2008/073153.

* cited by examiner

*Primary Examiner* — Toan N Pham
(74) *Attorney, Agent, or Firm* — Eric J. Robinson; Robinson Intellectual Property Law Office, P.C.

(57) ABSTRACT

A road-vehicle communication system comprises roadside apparatuses, a center device, and a vehicle-mounted device mounted in a vehicle. The roadside apparatuses are each given identification information for identifying itself. The center device transmits to the vehicle the identification information about a first roadside apparatus installed on the road where the vehicle is traveling as first identification information via the first roadside apparatus and the identification information about a second roadside apparatus via which the vehicle is expected to travel to the destination as second identification information when the vehicle is traveling in the lane of the road where the first roadside apparatus is installed. The vehicle-mounted device stores the transmitted first identification information. If the secondarily transmitted second identification information includes the stored first identification information, the vehicle-mounted device reproduces content information transmitted together with the second identification information. The vehicle-mounted device judges whether or not the content information is for the lane where the vehicle is traveling and reproduces the content information if so.

7 Claims, 8 Drawing Sheets

100
VEHICLE
VEHICLE-MOUNTED DEVICE
C
5
DSRC
·CONTENT INFORMATION
·OWN ROADSIDE APPARATUS IDENTIFICATION INFORMATION
·VIA ROADSIDE APPARATUS IDENTIFICATION INFORMATION
ROADSIDE APPARATUS
ROADSIDE APPARATUS
ROADSIDE APPARATUS
2
2
2
...
NETWORK N
CENTER APPARATUS
1

100
1
11
CONTROL UNIT
CPU
ROM
RAM
111
112
113
12
NETWORK COMMUNICATION UNIT
13
CONTENT INFORMATION STORAGE UNIT
14
ROADSIDE APPARATUS IDENTIFICATION INFORMATION STORAGE UNIT
N
2
21
CONTROL UNIT
CPU
ROM
RAM
211
212
213
23
NETWORK COMMUNICATION UNIT
22
DSRC COMMUNICATION UNIT
2a
C
VEHICLE
5
VEHICLE-MOUNTED DEVICE

FIG. 8

| VIA ROUTE | ROADSIDE APPARATUS IDS VIA WHICH VEHICLE TRAVELED | REPRODUCTION OF CONTENT INFORMATION |
|---|---|---|
| 1a | 1 → 2 | UTTER IN 2 |
| 1b | 1 → 5 → 3 | NO UTTERANCE |
| 1c | 1 → 5 → 4 | UTTER IN 4 |
| 2c | 2 → 5 → 4 | NO UTTERANCE |

ROAD-VEHICLE COMMUNICATION SYSTEM AND VEHICLE-MOUNTED DEVICE

TECHNICAL FIELD

The present invention relates to a road-vehicle communication system and a vehicle-mounted device.

BACKGROUND ART

Conventionally, there is known a road-vehicle communication system that includes a roadside apparatus installed on a road and a vehicle-mounted device mounted on a vehicle and performs two-way wireless communication between the roadside apparatus and the vehicle-mounted device. In this road-vehicle communication system, for example, a short-range communication system called DSRC (Dedicated Short Range Communication) is adopted.

The vehicle-mounted device is capable of performing the short-range wireless communication with the roadside apparatus and receiving information provision from a center apparatus via the roadside apparatus. Specifically, only in a period when the vehicle is within a communication range of the roadside apparatus, two-way communication between the vehicle-mounted device and the roadside apparatus is possible. Content information is provided from the center apparatus to the vehicle-mounted device via the roadside apparatus in this period.

The road-vehicle communication system can provide the vehicle-mounted device with, as the content information, information for supporting traveling (traveling support information) such as information indicating that there is an obstacle such as a stalled vehicle ahead on a road or there is a junction ahead. Therefore, the road-vehicle communication system is extremely effective for preventing traffic accidents.

In a road-vehicle communication system on a road having up and down traffic lanes, roadside apparatuses are respectively installed in the up traffic lane and the down traffic lane. The up and down traffic lanes are discriminated to provide traveling support information effective in the respective vehicle lanes. For example, the traveling support information is provided for each of the up and down lanes, for example, before a curve with poor visibility, a junction where a merging vehicle tends to be overlooked, and a section where various kinds of information such as a traffic situation that occurs ahead and weather conditions by a highway radio or the like.

In such a case, the traveling support information is provided for each of the up and down traffic lanes by installing a communicable range such that a radio wave originated from the roadside apparatus does not reach the opposite lane. However, because of leakage, irregular reflection, or the like of the radio wave, in some case, the traveling support information is provided to a vehicle on the opposite lane that is originally excluded from provision targets.

In particular, in a vehicle-mounted device (e.g., an utterance type vehicle-mounted device) that does not have a navigation function and cannot specify the present location (a traveling lane, a traveling direction, etc.) of a vehicle on which the vehicle-mounted device is mounted, basically, received information is directly reproduced (uttered). Therefore, if information that should not originally be provided is received and output, a driver is confused and safety of driving is likely to be hindered.

As a technique for preventing, for example, leakage of radio waves in the road-vehicle communication system, for example, there is Patent Document 1. A technique described in Patent Document provides, in an ETC system as an example of the road-vehicle communication system, a radio wave absorber that can suppress irregular reflection of radio waves in a communication area of a transmission and reception antenna and leakage of radio waves from the communication area.

Patent Document 1: Japanese Patent Application Laid-Open No. 2002-237719

DISCLOSURE OF THE INVENTION

Problems to be Solved by the Invention

However, although the technique described in Patent Document 1 is effective in a limited area of the ETC system provided in a tollgate in a highway or the like, it is difficult to apply the technique to a vehicle-road communication system in a general road. Specifically, the application of the technique described in Patent Document 1 to the general road requires dedicated infrastructures and requires enormous expenses and, moreover, spoils a view. Therefore, it is unrealistic to apply the technique to the general road.

It is an object of the present invention to provide a road-vehicle communication system in which a vehicle-mounted device judges whether content information provided from a center apparatus via a roadside apparatus is content information for a traveling lane of a vehicle on which the vehicle-mounted device is mounted and a vehicle-mounted device suitable for this system.

Means for Solving the Problems

In order to attain the object, a road-vehicle communication system according to a first embodiment of the present invention includes: a vehicle-mounted device mounted on a traveling vehicle; a plurality of roadside apparatuses that perform short-range communication with the vehicle-mounted device; and a center apparatus that is communicably connected to the roadside apparatuses and transmits content information to the vehicle-mounted device via the roadside apparatuses. Identification information for identifying each of the plurality of roadside apparatuses is given to the plurality of roadside apparatuses. The center apparatus operates to transmit the identification information concerning the roadside apparatus via the roadside apparatus as first identification information and transmit, as second identification information, identification information concerning a roadside apparatus via which the vehicle is expected to travel to reach a destination if the vehicle is traveling a lane where the roadside apparatus is installed. The vehicle-mounted device operates to store the first identification information transmitted from the center apparatus. If the stored first identification information is included in the second identification information transmitted from the center apparatus next time, the vehicle-mounted device operates to reproduce content information transmitted together with the second identification information.

A road-vehicle communication system according to a second embodiment includes: a vehicle-mounted device mounted on a traveling vehicle; and a plurality of roadside apparatuses that perform short-range communication with the vehicle-mounted device and transmit content information to the vehicle-mounted device. Identification information for identifying each of the plurality of roadside apparatuses is given to the plurality of roadside apparatuses. The roadside apparatus operates to transmit the identification information concerning the roadside apparatus as first identification information and transmit, as second identification information, identification information concerning a roadside apparatus via which the vehicle is expected to travel to reach a destination if the vehicle is traveling a traffic lane where the roadside apparatus is installed. The vehicle-mounted device operates to store the first identification information transmitted from the roadside apparatus. If the stored first identification information is included in the second identification information transmitted from the roadside apparatus next time, the vehicle-mounted device operates to reproduce content information transmitted together with the second identification information.

In another aspect, the present invention is understood as the configuration of a vehicle-mounted device. The vehicle-mounted device according to the present invention basically includes: a communication unit that can perform wireless communication with a plurality of roadside apparatuses to which identification information for identifying each of the plurality of roadside apparatuses is given, receives the identification information concerning the roadside apparatus, which is transmitted from the roadside apparatus, as first identification information, and receives, as second identification information, identification information concerning a roadside apparatus via which the vehicle is expected to travel to reach a destination if the vehicle is traveling a traffic lane where the roadside apparatus is installed; a storage unit that stores the first identification information transmitted from the roadside apparatus; a reproducing unit that reproduces content information provided from the roadside apparatus; and a control unit that causes, if the first identification information stored in the storage unit is included in the second identification transmitted from the roadside apparatus, the reproducing unit to reproduce content information transmitted together with the second identification information.

In the vehicle-mounted device according to the present invention, preferably, the control unit operates to cause the storage unit to store and accumulate in order the first identification information transmitted from the roadside apparatus and cause, if any one kind of the first identification information stored in the storage unit is included in second identification information transmitted from the roadside apparatus next time, the reproducing unit to reproduce content information transmitted together with the second identification information.

Further, preferably, in the vehicle-mounted device according to the present invention, the control unit operates to delete, if the content information transmitted from the roadside apparatus is reproduced, the first identification information stored in the storage unit and cause the storage unit to store anew the first identification information received this time.

In the vehicle-mounted device according to the present invention, the content information can be traveling support information provided to be discriminated for up and down traffic lanes of a road.

Further, the vehicle-mounted device according to the present invention may not have a navigation function and may not be able to understand a location and a traveling direction of the vehicle on which the vehicle-mounted device is mounted.

EFFECTS OF THE INVENTION

With the road-vehicle communication system according to the present invention, the vehicle-mounted device judges whether the content information provided from the center apparatus or the roadside apparatus is content information for a traffic lane where the vehicle travels and outputs the content information. Therefore, it is possible to prevent content information that should not originally be provided to a driver from being provided.

Therefore, since the driver can receive provision of effective content information and is not confused by wrong content information, safety of driving can be improved.

BRIEF DESCRIPTION OF THE DRAWINGS

FIG. 8 is an explanatory diagram showing an example of content reproduction executed by the vehicle-mounted device 5 in a state in which the roadside apparatuses shown in FIG. 7 are installed.

DESCRIPTION OF SYMBOLS

1 center apparatus
2 roadside apparatus
5 vehicle-mounted device
100 road-vehicle communication system
C vehicle
N network

BEST MODES FOR CARRYING OUT THE INVENTION

An embodiment of the present invention is explained below on the basis of the drawings.

Figure 1:
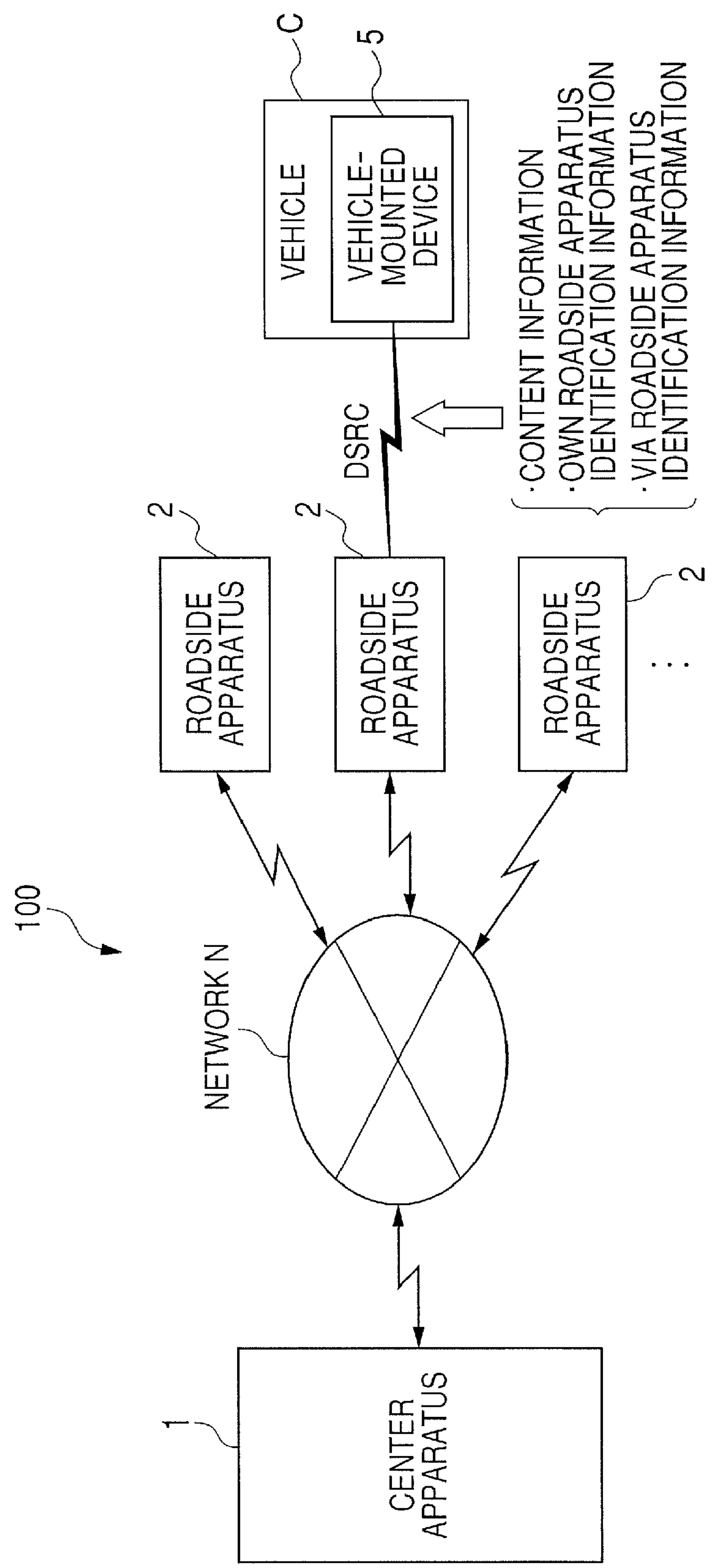
FIG. 1 is an explanatory diagram showing the system configuration of a road-vehicle communication system according to an embodiment of the present invention.

FIG. 1 is an explanatory diagram showing the system configuration of a road-vehicle communication system 100 according to this embodiment.

As shown in FIG. 1, the road-vehicle communication system 100 includes a center apparatus 1, roadside apparatuses 2, and a vehicle-mounted device 5 mounted on a vehicle C. In FIG. 1, only one center apparatus 1 is shown. However, there are a plurality of providers that provide content information including delivery carriers that deliver local information. The center apparatus 1 is provided for each of the providers.

A plurality of the roadside apparatuses 2 are installed on roads, parking lots, and the like. Each of the roadside apparatuses 2 is connected to the center apparatus 1 via a network N. The roadside apparatus 2 performs transmission and reception of information with the vehicle-mounted device 5 through short-range communication (DSRC).

Specifically, the center apparatus 1 is capable of providing the vehicle-mounted device 5 with content information via the roadside apparatus 2. The vehicle-mounted device 5 performs reproduction processing on the basis of the provided content information and, for example, outputs sound from a loudspeaker.

In this embodiment, the vehicle-mounted device 5 judges whether content information provided to be discriminated for each of up and down traffic lanes such as traveling support information is content information provided for a traffic lane where the vehicle C travels.

Therefore, the roadside apparatus 2 transmits, to the vehicle-mounted device 5, together with the content information, identification information concerning the roadside apparatus 2 (own roadside apparatus identification information) and identification information concerning the roadside apparatus 2 via which the vehicle C is expected to travel to reach a destination if the vehicle C is traveling the traffic lane where the roadside apparatus 2 is installed (via roadside apparatus identification information).

Specifically, the vehicle-mounted device 5 stores and accumulates the own roadside apparatus identification information transmitted from the roadside apparatus 2. Thereafter, if the stored roadside apparatus identification information is included in via roadside apparatus identification information provided from another roadside apparatus 2, the vehicle-mounted device 5 judges that content information provided from the other roadside apparatus 2 is information concerning a traffic lane where the vehicle C is traveling and reproduces the content information.

Consequently, it is possible to prevent content information that should not originally be provided to a driver (e.g., content information for the opposite lane) from being provided. Therefore, since the driver can receive provision of effective content information and is not confused by wrong content information, safety of driving can be improved.

Figure 2:
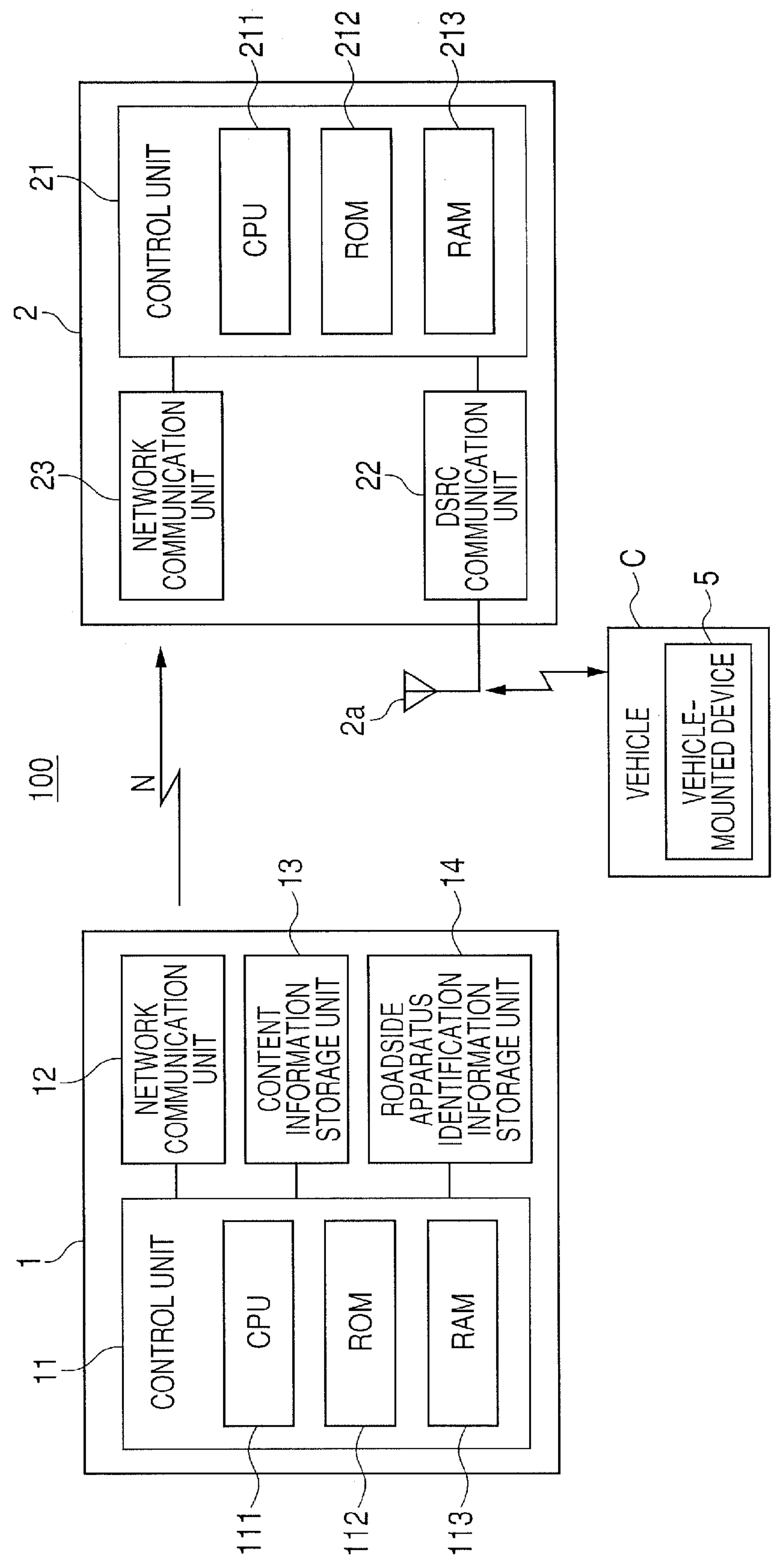
FIG. 2 is a block diagram showing the internal configuration of a center apparatus and a roadside apparatus.

FIG. 2 is a block diagram showing the internal configuration of the center apparatus 1 and the roadside apparatus 2. Specifically, the center apparatus 1 and the roadside apparatus 2 include processing apparatuses (e.g., computer terminals) including functional blocks shown in FIG. 2.

As shown in FIG. 2, the center apparatus 1 includes a control unit 11, a content information storage unit 13, a network communication unit 12, and a roadside apparatus identification information storage unit 14.

The control unit 11 includes a CPU 111, a ROM 112, and a RAM 113. The CPU 111 executes, using the RAM 113 as a work area, a control program stored in the ROM 112 to thereby control the network communication unit 13 besides performing various arithmetic operations.

The network communication unit 12 transmits content information, own roadside apparatus identification information, and via roadside apparatus identification information (hereafter referred to as content information and the like) to the roadside apparatus 2 via the network N. The content information and the like are transmitted from a DSRC communication unit 22 of the roadside apparatus 2 to the vehicle-mounted device 5.

The content information storage unit 13 includes, for example, a hard disk and stores content information to be provided to the vehicle-mounted device 5. The content information mainly includes read-aloud information provided to the vehicle-mounted device 5. Examples of content of the content information include, besides information for supporting traveling (traveling support information) such as information indicating that there is an obstacle such as stalled vehicle ahead on a road or there is a junction ahead, advertisements of stores and guidance to parking lots and facilities. In particular, some kind of traveling support information is provided to be discriminated for up and down traffic lanes of a road.

The roadside apparatus identification information storage unit 14 includes, for example, a nonvolatile memory and stores roadside apparatus identification information to be transmitted to the vehicle C together with the content information.

This roadside apparatus identification information is not specifically limited as long as the roadside apparatus identification information is information with which the roadside apparatus that is transmitting content information to the vehicle-mounted device 5 can be identified. For example, a peculiar roadside apparatus ID given to the roadside apparatus 2, a beacon ID used in a VICS (Vehicle Information and Communication System), installing location information (latitude and longitude information) of the roadside apparatus, and the like can be used.

The roadside apparatus identification information storage unit 14 stores, for each of the plurality of roadside apparatuses 2 included in the road-vehicle communication system 100, for example, identification information concerning the roadside apparatus 2 that is caused to transmit content information to the vehicle-mounted device 5 (own roadside apparatus identification information) and identification information concerning the roadside apparatus 2 via which the vehicle C is expected to travel to reach a destination if the vehicle C is traveling a traffic lane where the roadside apparatus 2 is installed (via roadside apparatus identification information).

For example, when content information is transmitted to the vehicle-mounted device 5 via the roadside apparatus 2, the control unit 11 causes the roadside apparatus 2 to transmit road-side identification information based on the roadside apparatus 2, which is caused to transmit this content information, together with the content information.

The roadside apparatus 2 includes a control unit 21, a DSRC communication unit 22, and a network communication unit 23.

The control unit 21 includes a CPU 211, a ROM 212, and a RAM 213. The CPU 211 executes, using the RAM 213 as a work area, a control program stored in the ROM 212 to thereby control the DSRC communication unit 22 and the network communication unit 23 besides performing various arithmetic operations.

The DSRC communication unit 22 performs transmission and reception of content information and the like with the vehicle-mounted device 5 mounted on the vehicle C through DSRC.

The network communication unit 23 receives content information and the like from the center apparatus 1 via the network N.

The roadside apparatus 2 always originates a DSRC radio wave having content information and roadside apparatus identification information (own roadside apparatus identification information and via roadside apparatus identification information), for example, when a command for providing the vehicle-mounted device 5 with content information and the like is received from the center apparatus 1.

Figure 3:
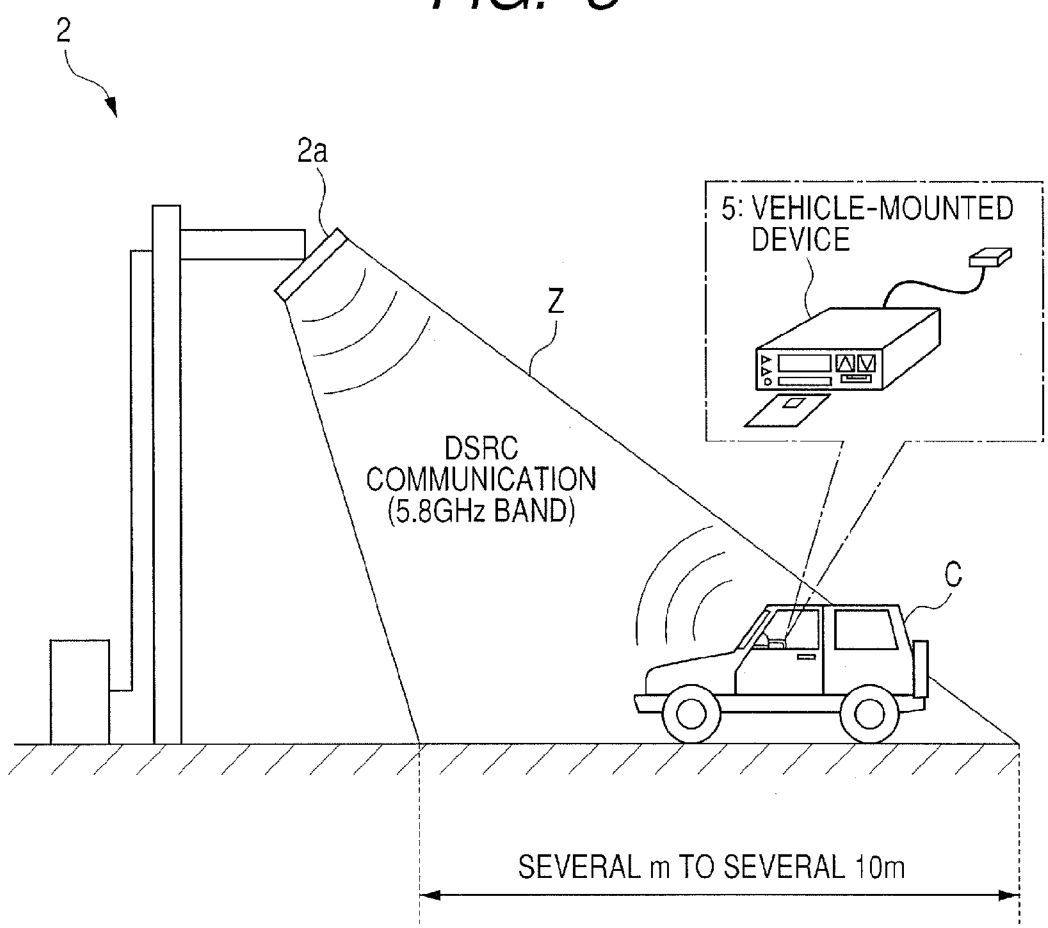
FIG. 3 is an explanatory diagram of a roadside area that is a communicable range of the roadside apparatus.

FIG. 3 is an explanatory diagram a roadside area Z that is a communicable range of the roadside apparatus 2.

As shown in FIG. 3, the roadside apparatus 2 radiates a DSRC radio wave having a limited reaching distance from an antenna 2*a* installed beside a road or above the road and forms the roadside area Z near the roadside apparatus. The DSRC is a short-range communication system employing a radio wave in a 5.8 GHz band. A communication range of the DSRC is set to, for example, several meters to several tens of meters.

In the road-vehicle communication system 100, the plurality of roadside apparatuses 2 are installed. However, since all outputs of DSRC radio waves from the roadside apparatuses 2 are set to the same degree, roadside areas respectively formed by the plurality of roadside apparatuses 2 are substantially fixed irrespectively of installing locations. The roadside apparatuses 2 are capable of performing two-way wireless communication (road-vehicle communication) only with the vehicle-mounted device 5 mounted on the vehicle C present in the roadside areas of the roadside apparatuses 2.

In general, if the roadside apparatus 2 is installed on a road having up and down traffic lanes, the roadside area Z is set such that a DSRC radio wave originated from the roadside apparatus 2 does not reach the opposite lane. This makes it possible to provide content information (e.g., traveling support information) for each of the up and down traffic lanes.

However, because of leakage, reflection, or the like of a radio wave, in some case, content information is provided to a vehicle on the opposite lane that is originally excluded from provision targets. In this embodiment, even if the content information for the opposite lane is provided in this way, it is possible to reproduce only content information for the traveling lane without reproducing the content information for the opposite lane.

Figure 4:
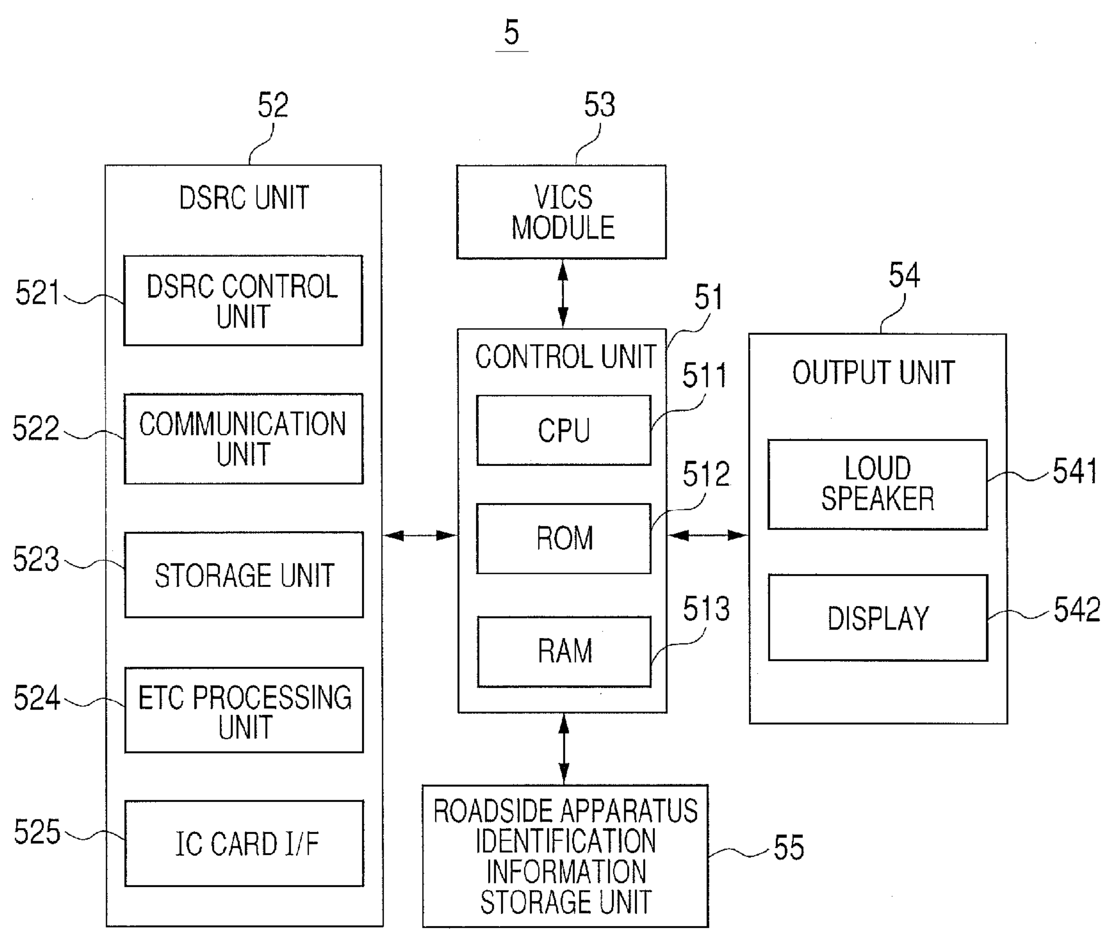
FIG. 4 is a block diagram showing a configuration example of a vehicle-mounted device mounted on a vehicle.

FIG. 4 is a block diagram showing a configuration example of the vehicle-mounted device 5 mounted on the vehicle C.

The vehicle-mounted device 5 is an ITS vehicle-mounted device applicable to an ITS (Intelligent Transport Systems). The vehicle-mounted device 5 is a vehicle-mounted device that receives and reproduces content information and the like transmitted from the center apparatus via the roadside apparatus in the conventional road-vehicle communication system.

As shown in FIG. 4, the vehicle-mounted device 5 includes a control unit 51, a DSRC unit 52, a VICS module 53, an output unit 54, and a roadside apparatus identification information storage unit 55.

The control unit 51 includes a CPU 511, a ROM 512, and a RAM 513. The CPU 511 executes, using the RAM 513 as a work area, a control program stored in the ROM 512 to thereby perform concentrated control of the units besides performing various arithmetic operations.

For example, when communication by the DSRC is performed with the roadside apparatus 2, the CPU 511 controls communication operation of the DSRC unit 52. In controlling the DSRC unit 52, the CPU 511 performs control through cooperation with a DSRC control unit 521 of the DSRC unit 52.

When charging information transmitted from an ETC base station provided in an exit ramp of a toll road is received by the DSRC unit 52, the CPU 511 controls the DSRC unit 52 (an ETC processing unit 524) to perform charging processing based on settlement information.

Further, the CPU 511 executes a content reproduction program stored in the ROM 512 to thereby perform, concerning content information provided for each of the traffic lanes, processing for reproducing only effective content information in the traveling lane of the vehicle mounted with the vehicle-mounted device 5 on the basis of roadside apparatus identification information transmitted from the roadside apparatus 2. This content reproduction processing is explained later.

The DSRC unit 52 includes the DSRC control unit 521, a DSRC communication unit 522, a storage unit 523, the ETC processing unit 524, an IC card interface 525. The DSRC unit 52 performs processing for communicating with a roadside apparatus and an ETC base station through the DSRC.

The DSRC control unit 521 includes a CPU, a ROM, and a RAM (all of which are not shown in the figure). The DSRC control unit 521 controls the operation of the units of the DSRC unit 52 through cooperation with a control program stored in the ROM.

For example, when settlement by the ETC is performed, the DSRC control unit 521 controls communication operation of the DSRC communication unit 522 to cause the DSRC communication unit 522 to receive settlement information from the ETC base station. The DSRC control unit 521 causes the ETC processing unit 524 to perform processing for writing the settlement information in an IC of a credit card or the like.

For example, if content information is received by the DSRC communication unit 522 from the center apparatus 1 via the roadside apparatus 2, the DSRC control unit 521 transfers the content information to the control unit 51.

The DSRC communication unit 522 includes an antenna installed on the dashboard and near the windshield of the vehicle C. The DSRC communication unit 522 performs communication by the DSRC with the roadside apparatus 2 and the ETC base station via this antenna.

The storage unit 523 includes, for example, a nonvolatile memory and stores a vehicle-mounted device ID attached to the vehicle-mounted device 5, vehicle information concerning the vehicle C mounted with the vehicle-mounted device 5, and the like.

The vehicle-mounted device ID is vehicle-mounted device information attached to each vehicle-mounted device during manufacturing. The vehicle information includes license plate information and vehicle type information (a large vehicle, a medium vehicle, a small vehicle, a handicapped driver vehicle, etc.) of the vehicle C mounted with the vehicle-mounted device 5. The vehicle information is registered when the vehicle-mounted device 5 is mounted on the vehicle C (setup).

The ETC processing unit 524 reads settlement information or the like from and writes settlement information or the like in a credit card with IC, a debit card, or the like inserted into and removed from the IC card interface 525.

The IC card interface 525 includes a slot for a credit card and the like and mediates exchange of information between an IC of a credit card or the like inserted into this slot and the ETC processing unit 524.

The VICS module 53 includes antennas respectively for optical communication, FM communication, and 2.4 GHz radio wave communication and performs the optical communication, the FM communication, and the radio wave communication with a VICS (Vehicle Information and Communication System) center. The VICS module 33 receives traffic jam information, road traffic information, or the like from the VICS center and transfers the information to the control unit 51.

The output unit 54 includes a loudspeaker 541 and a display 542. For example, when content information provided from the center apparatus 1 is reproduced, sound guidance is output in the loudspeaker 541 and display guidance is output in the display.

The roadside apparatus identification information storage unit 55 stores identification information (first identification information) of roadside apparatus transmitted from the center apparatus 1 via the roadside apparatus. Therefore, identification information concerning the roadside apparatuses via which the vehicle C travels is stored and accumulated in order in the roadside apparatus identification information storage unit 55.

As explained above, since the vehicle-mounted device 5 according to this embodiment does not have a navigation function, the vehicle-mounted device 5 cannot understand a location and a traveling direction of the vehicle C mounted with the vehicle-mounted device 5. Therefore, if content information for each of the traffic lanes is transmitted from the roadside apparatus 2, the vehicle-mounted device 5 cannot specify a traveling lane of the vehicle C and perform reproduction of the content information.

In the road-vehicle communication system 100 according to this embodiment, the roadside apparatus 2 that transmits content information transmits identification information concerning the roadside apparatus 2 (own roadside apparatus identification information) and transmits identification information concerning the roadside apparatus 2 via which the vehicle C is expected to travel to reach a destination if the vehicle C is traveling on a traffic lane where the roadside apparatus 2 is installed. This enables the vehicle-mounted device 5 to judge whether content reproduction conditions are satisfied and reproduce only appropriate content information for the traveling lane.

Content reproduction processing executed in the vehicle-mounted device 5 is explained with reference to FIGS. 5 to 8.

Figure 5:
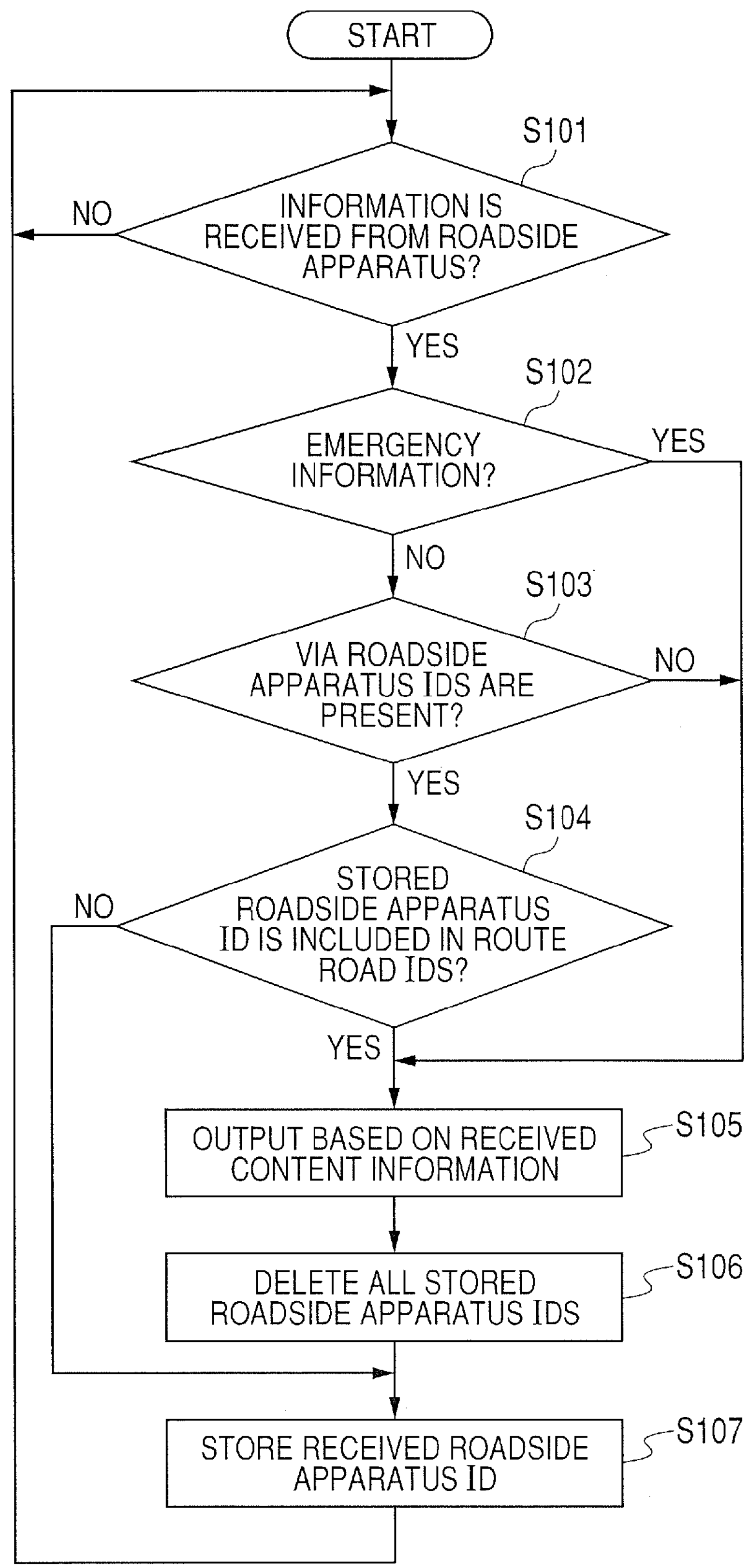
FIG. 5 is a flowchart showing an example of content reproduction processing executed in a vehicle-mounted device 5.

FIG. 5 is a flowchart showing an example of the content reproduction processing executed in the vehicle-mounted device 5. This content reproduction processing is realized by, in the vehicle-mounted device 5, the CPU 511 executing the content reproduction program in the ROM 512. In this embodiment, it is assumed that a roadside apparatus ID is used as roadside apparatus identification information.

Figure 6:
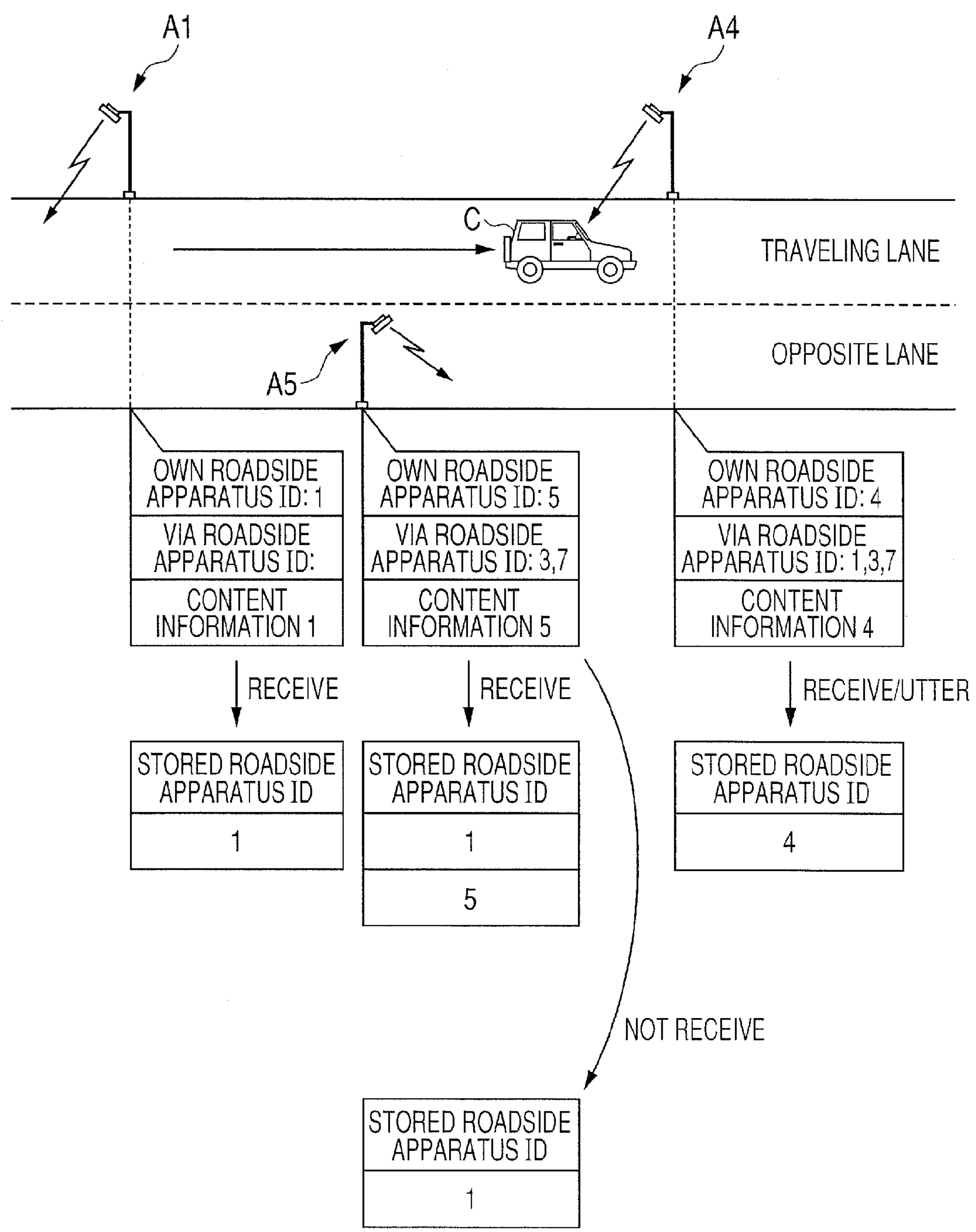
FIG. 6 is an explanatory diagram showing information transmitted and received between a road and a vehicle and information stored in the vehicle-mounted device.
Figure 7:
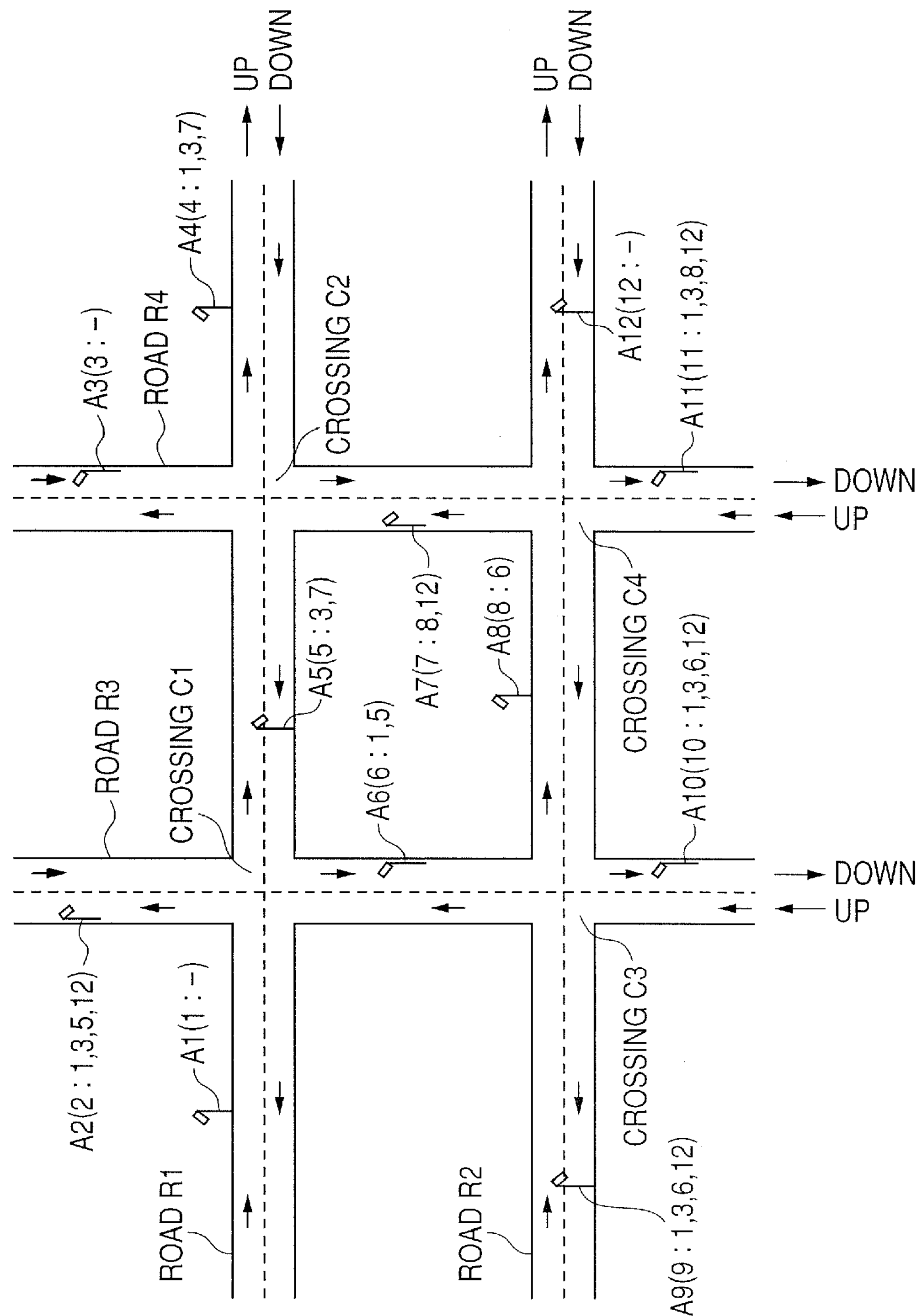
FIG. 7 is an explanatory diagram showing an example of a installing state of roadside apparatuses.

FIG. 6 is an explanatory diagram showing information transmitted and received between a road and a vehicle and information stored in the vehicle-mounted device 5. A part of FIG. 7 is extracted and shown in FIG. 6. Specifically, roadside apparatuses A1 and A4 are provided on the traveling lane side of the vehicle C. A roadside apparatus A5 is provided on the opposite lane side.

As shown in FIG. 6, the roadside apparatuses A1, A4, and A5 transmit own roadside apparatus IDs (own roadside apparatus identification information), via roadside apparatus IDs (via roadside apparatus identification information), and content information to the vehicle-mounted device 5. The via roadside apparatus ID "-" in the roadside apparatus A1 indicates that the via roadside apparatus ID is a roadside apparatus ID of a roadside apparatus installed on a road other than a road shown in FIG. 7.

In FIG. 5, in step S101, the CPU 511 judges whether the vehicle C passes the roadside area Z of the roadside apparatus 2 and receives content information and the like. When the vehicle C receives content information and the like, the CPU 511 shifts to step S102.

In step S102, the CPU 511 judges whether the received content information is emergency information for instructing the driver to perform actions such as vehicle stall and evacuation during disaster. It is possible to judge according to an ID number attached to the content information whether the content information is the emergency information.

If the CPU 511 judges that the received content information is the emergency information, the CPU 511 shifts to step S106 and reproduces the content information. On the other hand, if the CPU 511 judges that the received content information is not the emergency information, the CPU 511 shifts to step S103.

Specifically, if the received content information is the emergency information, the CPU 511 causes the vehicle-mounted device 5 to reproduce the content information irrespectively of whether the roadside apparatus 2 is a roadside apparatus installed in the traveling lane.

In step S103, the CPU 511 judges whether via roadside apparatus IDs are included in the received information. If the CPU 511 judges that via roadside apparatus IDs are included in the received information, the CPU 511 shifts to step S104. If the CPU 511 judges that via roadside apparatus IDs are not included in the received information, the CPU 511 shifts to step S106.

For example, since via roadside apparatus IDs are not provided in the road-vehicle communication system used in the past, the content information is reproduced in such a case.

In step S104, the CPU 511 judges whether a stored roadside apparatus ID (a roadside apparatus ID of a roadside apparatus that actually received content information and the like) is included in the received via roadside apparatus IDs. If there are a plurality of stored roadside apparatus IDs, the CPU 511 judges whether any one of the stored roadside apparatus IDs is included in the received via roadside apparatus IDs. During the start of operation or the like, if no roadside apparatus ID is stored, the received via roadside apparatus IDs may be treated as not including a stored roadside apparatus ID.

If the CPU 511 judges that the stored roadside apparatus ID is not included in the received via roadside apparatus IDs, the CPU 511 shifts to step S107 and further stores a received own roadside apparatus ID as a roadside apparatus ID via which the vehicle C traveled.

For example, in FIG. 6, the roadside apparatus A5 transmits an own roadside apparatus ID "5", via roadside apparatus IDs "3 and 7", and content information 5 to the vehicle C. When the vehicle C passes the roadside apparatus A5, if the vehicle C receives content information and the like irrespectively of the fact that the content information and the like are information for the opposite lane, the stored roadside apparatus ID "1" is not included in the received via roadside apparatus IDs "3 and 7". Therefore, the own roadside apparatus ID "5" is added as a roadside apparatus ID via which the vehicle C traveled. When the vehicle C passes the roadside apparatus A5, if the vehicle C receives content information and the like, a roadside apparatus ID via which the vehicle C traveled is still only "1".

At this point, it is difficult to judge which traffic lane is the traveling lane of the vehicle C (because the roadside apparatus A1 may be a roadside apparatus for the opposite lane and the roadside apparatus A5 may be a roadside apparatus for the traveling lane). Therefore, an actually received own roadside apparatus ID is stored as a roadside apparatus ID via which the vehicle C traveled.

If the CPU 511 judges in step S104 that the stored roadside apparatus ID is included in the received via roadside apparatus IDs, the CPU 511 shifts to step S105.

For example, in FIG. 6, the roadside apparatus A4 transmits an own roadside apparatus ID "4", a via roadside apparatus ID "1", and content information 4 to the vehicle C. The vehicle C receives the via roadside apparatus ID "1" when the vehicle C passes the roadside apparatus A4. On the other hand, "1 and 5" (information is received by the roadside apparatus A5) or "1" (information is not received by the roadside apparatus A5) is stored in the roadside apparatus identification information storage unit 55 of the vehicle-mounted device 5 as a roadside apparatus ID via which the vehicle C traveled. Therefore, any one of the stored roadside apparatus IDs is included in the via roadside apparatus ID "1" received from the roadside apparatus A4.

In step S105, the CPU 511 reproduces the received content information. For example, the CPU 511 reproduces the received content information in the output unit 54 of the vehicle-mounted device 5, outputs sound guidance in the loudspeaker 541, or outputs screen display guidance in the display 542. In FIG. 6, when the vehicle C passes the roadside apparatus A4, the content information 4 is reproduced.

In step S106, the CPU 511 deletes all the roadside apparatus IDs stored in the roadside apparatus identification information storage unit 55 of the vehicle-mounted device 5.

In step S107, the CPU 511 stores a received own roadside apparatus ID anew. For example, in FIG. 6, when the vehicle C passes the roadside apparatus A4, the roadside apparatus IDs "1 and 5" (information is received by the roadside apparatus A5) or "1" (information is not received by the roadside apparatus A5) via which the vehicle C traveled, which is stored in the roadside apparatus identification information storage unit 55 of the vehicle-mounted device 5, is deleted. A roadside apparatus ID "4" of the roadside apparatus A4 is stored anew.

In this way, if the vehicle-mounted device 5 reproduced the content information transmitted from the center apparatus 1, the vehicle-mounted device 5 deletes a roadside apparatus ID stored as a roadside apparatus ID via which the vehicle C traveled and stores anew a roadside apparatus ID received this time as a roadside apparatus ID via which the vehicle C traveled. Consequently, it is possible to prevent a situation in which too many roadside apparatus IDs via which the vehicle C traveled are accumulated and content information is highly likely to be reproduced by mistake (highly likely to be included in via roadside apparatus IDs).

If a fixed number of roadside apparatus IDs are accumulated, the roadside apparatus IDs may be deleted in order from the oldest one and rewritten with a roadside apparatus ID acquired anew.

It is specifically explained with reference to FIGS. 7 and 8 how content information is reproduced in the road-vehicle communication system 100 in which the plurality of roadside apparatuses 2 are installed on a general road.

FIG. 7 is an explanatory diagram showing an example of a installing state of roadside apparatuses. In FIG. 7, own roadside apparatus IDs and via roadside apparatus IDs transmitted by the roadside apparatuses are indicated in a form of "signs (an own roadside apparatus ID a via roadside apparatus ID) of a roadside apparatus". Specifically, the roadside apparatus A1 transmits an own roadside apparatus ID "1" and a via roadside apparatus ID "-" to the vehicle C. The roadside apparatus A2 transmits an own roadside apparatus ID "2" and via roadside apparatus IDs "1, 3, 5, and 12" to the vehicle C.

In FIG. 7, some roadside apparatus ID is not included in via roadside apparatus IDs provided by the roadside apparatuses irrespectively of the fact that the vehicle C is expected to travel via the roadside apparatus ID to reach a destination if the vehicle C travels on a traffic lane where the roadside apparatuses are installed. For example, concerning the roadside apparatus A2, it is also conceivable that the vehicle C traveling on a traffic lane (an up traffic lane of a road R3) where the roadside apparatus A2 is installed travels via the roadside apparatus A7. However, a roadside apparatus ID of this roadside apparatus A7 is not installed as a via roadside apparatus ID. This is because, in this case, since the vehicle C always travels via the roadside apparatus A5, a roadside apparatus ID of the roadside apparatus A5 may be installed as a via roadside apparatus ID. In via roadside apparatus IDs via which the vehicle C is expected to travel in a predetermined range, IDs via which the vehicle C could travel before a via roadside apparatus ID in a traveling direction that should be output are held.

FIG. 8 is an explanatory diagram showing an example of content reproduction executed in the vehicle-mounted device 5 in a state in which the roadside apparatuses shown in FIG. 7 are installed. In FIG. 8, a route where a vehicle travels, a roadside apparatus ID of a roadside apparatus received in the route, and presence or absence of reproduction of content information are shown in association with one another. In the following explanation, it is assumed that all kinds of content information and the like transmitted from a roadside apparatus are received irrespectively of whether a traffic lane is the traveling lane or the opposite lane.

For example, a route 1*a* is a route in which a vehicle travels an up traffic lane of a road R1, turns to the left at a crossing C1, and travels the up traffic lane of the road R3. In a vehicle-mounted device mounted on the vehicle traveling the route 1*a*, content information and the like are received in order in the roadside apparatuses A1 and A2 and, when the vehicle passes the roadside apparatus A2, the content information is reproduced (uttered).

A route 1*b* is a route in which a vehicle travels the up traffic lane of the road R1, turns to the left at a crossing C1, and travels the up traffic lane of the road R4. In a vehicle-mounted device mounted on the vehicle traveling the route 1*b*, content information and the like are received in order in the roadside apparatuses A1, A5, and A3. However, content information received from any one of the roadside apparatuses A1, A5, and A3 is not reproduced (uttered). Specifically, when the vehicle passes the roadside apparatus A5, the roadside apparatus ID "1" of the roadside apparatus A1 is not included in via roadside apparatus IDs in the roadside apparatus A5 ("NO" in step S104 in FIG. 5). Therefore, the content information is not reproduced. In the roadside apparatus A3, since a via roadside apparatus ID is a roadside apparatus ID of a road other than the roads shown in FIG. 7, the content information is not reproduced.

A route 1*c* is a route in which a vehicle travels straight the up traffic lane of the road R1. In a vehicle-mounted device mounted on a vehicle traveling the route 1*c*, content information and the like are received in order in the roadside apparatuses A1, A5, and A4 and the content information is reproduced (uttered) when the vehicle passes the roadside apparatus A4. When the vehicle passes the roadside apparatus A5, since the roadside apparatus ID "1" of the roadside apparatus A1 is not included in via roadside apparatus IDs in the roadside apparatus A5 ("NO" in step S103 in FIG. 5), the content information is not reproduced.

As in the route 2*c*, even if content information and the like are received from the roadside apparatus A4 installed in the traveling lane of the vehicle, in some case, the content information is not reproduced. However, such a problem is considered to be solved by contriving installing of roadside apparatuses. For example, at least one roadside apparatus may be installed in each of an up traffic lane and a down traffic lane in the same section.

In this way, in the routes explained above, content information transmitted from the roadside apparatus is reproduced only when the content information is content information for the traffic lane where the vehicle is traveling. Specifically, with the road-vehicle communication system 100 according to this embodiment, when content information and the like are received twice from the roadside apparatus installed in the traveling lane of the vehicle, the vehicle-mounted device judges that the content information is content information for the traveling lane and reproduces the content information.

As explained above, the road-vehicle communication system 100 according to this embodiment includes the vehicle-mounted device 5 mounted on the traveling vehicle, the plurality of roadside apparatuses 2 that perform short-range communication with the vehicle-mounted device 5, and the center apparatus 1 that is communicably connected to the roadside apparatuses 2 and transmits content information to the vehicle-mounted device 5 via the roadside apparatuses 2.

The identification information for identifying each of the plurality of roadside apparatuses 2 is given to the plurality of roadside apparatuses 2.

The center apparatus 1 transmits the identification information concerning the roadside apparatus 2 via the roadside apparatus 2 as first identification information (an own roadside apparatus ID) and transmits, as second identification information (a via roadside apparatus ID), identification information concerning the roadside apparatus via which the vehicle is expected to travel to reach a destination if the vehicle is traveling a traffic lane where the roadside apparatus 2 is installed.

On the other hand, the vehicle-mounted device 5 stores the first identification information transmitted from the center apparatus 1 and reproduces, if the stored first identification information is included in second identification information transmitted from the center apparatus 1 next time, content information transmitted together with the second identification information.

In this way, the vehicle-mounted device 5 judges whether content information provided from the center apparatus 1 via the roadside apparatus 2 is content information for the traveling lane of the vehicle and outputs the content information. Therefore, it is possible to prevent content information that should not originally be provided to a driver from being provided.

Therefore, since the driver can receive provision of effective content information and is not confused by wrong content information, safety of driving can be improved.

The vehicle-mounted device 5 stores and accumulates in order first identification information (own roadside apparatus IDs) transmitted from the center apparatus 1 and reproduces, if any one kind of the stored first identification information is included in second identification information (via roadside apparatus IDs) transmitted from the center apparatus 1 next time, content information transmitted together with the second identification information.

Consequently, after content information and the like are received from the roadside apparatus installed on the traveling lane, even if content information and the like are received by mistake from the roadside apparatus installed on the opposite lane, thereafter, when content information and the like are received from the roadside apparatus installed on the traveling lane, the content information is normally reproduced at that point.

If content information is traveling support information provided to be discriminated for up and down traffic lanes of a road, if content information for the opposite lane is reproduced by mistake, this is likely to lead to a traffic accident or the like. Therefore, it is extremely meaningful not to reproduce the content information.

The vehicle-mounted device 5 according to this embodiment does not have a navigation function and cannot understand a location and a traveling direction of the vehicle mounted with the vehicle-mounted device. However, it is possible to cause even such a vehicle-mounted device to reproduce content information for the traveling lane. In other words, it is possible to realize the road-vehicle communication system according to the present invention even with an inexpensive vehicle-mounted device not having a navigation function.

The invention devised by the inventor has been specifically explained on the basis of the embodiment. However, the present invention is not limited to the embodiment and can be changed in a range without departing from the spirit of the present invention.

In the embodiment, a roadside apparatus ID of a roadside apparatus via which the vehicle traveled is stored and this stored roadside apparatus ID and a via roadside apparatus ID via which the vehicle is expected to have traveled are compared to judge whether content information is reproduced. However, the vehicle-mounted device may be caused to judge content reproduction conditions with other methods.

For example, it is also possible to store a via roadside apparatus ID via which the vehicle is expected to travel in future and compare this stored via roadside apparatus ID and an own roadside apparatus ID received this time to judge whether content information is reproduced.

Specifically, the center apparatus 1 transmits identification information concerning the roadside apparatus 2 via the roadside apparatus 2 as first identification information and transmits, as second identification information, identification information concerning one or two or more roadside apparatuses via which the vehicle is expected to travel next if the vehicle is traveling a traffic lane where the roadside apparatus 2 is installed.

The vehicle-mounted device 5 stores the second identification information transmitted from the center apparatus 1 and reproduces, if first identification information transmitted from the center apparatus 1 next time is included in the stored second identification information, content information provided together with the first identification information.

As content information, there is information provided in common to up and down traffic lanes. In this case, it is desirable to not cause the center apparatus 1 to transmit roadside apparatus identification information together with the content information and to cause the vehicle-mounted device 5 to reproduce all kinds of received content information.

In the embodiment, the road-vehicle communication system that provides the vehicle-mounted device with content information from the center apparatus 1 via the roadside apparatus 2 is explained. However, a configuration not including the center apparatus 1 can be adopted. In this case, the roadside apparatus 2 has content information and roadside apparatus identification information (an own roadside apparatus ID and a via roadside apparatus ID) and directly provides the vehicle-mounted device 5 with these kinds of information.

In the embodiment, the example in which a roadside apparatus ID peculiar to the roadside apparatus is used as roadside apparatus identification information is explained. However, it is also possible to use a beacon ID used in the VICS, installing location information (latitude and longitude information) of the roadside apparatus, and the like.

Even if the vehicle-mounted device 5 is a so-called utterance type vehicle-mounted device not including a display as an output unit, the present invention can be applied to the vehicle-mounted device 5.

The embodiment disclosed herein should be considered illustrative in every aspect and not limiting. The scope of the present invention is indicated by the scope of the patent claims rather than the above explanation. It is intended that all changes within meanings and scopes equivalent to the scope of the patent claims are included in the present invention.

The invention claimed is:

1. A road-vehicle communication system comprising:

a vehicle-mounted device mounted on a traveling vehicle;

a plurality of roadside apparatuses that perform short-range communication with the vehicle-mounted device; and a center apparatus that is communicably connected to the roadside apparatuses and transmits content information to the vehicle-mounted device via the roadside apparatuses, wherein identification information for identifying each of the plurality of roadside apparatuses is given to the plurality of roadside apparatuses, the center apparatus transmits the identification information concerning the roadside apparatus via the roadside apparatus as first identification information and transmits, as second identification information, identification information concerning a roadside apparatus via which the vehicle is expected to travel to reach a destination if the vehicle is traveling in a traveling direction a traffic lane where the roadside apparatus is installed, and the vehicle-mounted device stores the first identification information transmitted from the center apparatus and, if the stored first identification information is included in the second identification information transmitted from the center apparatus next time, reproduces content information transmitted together with the second identification information and deletes the second identification information transmitted from the center apparatus after reproducing the content information.

2. A road-vehicle communication system comprising:

a vehicle-mounted device mounted on a traveling vehicle; and a plurality of roadside apparatuses that perform short-range communication with the vehicle-mounted device and transmit content information to the vehicle-mounted device, wherein identification information for identifying each of the plurality of roadside apparatuses is given to the plurality of roadside apparatuses, the roadside apparatus transmits the identification information concerning the roadside apparatus as first identification information and transmits, as second identification information, identification information concerning a roadside apparatus via which the vehicle is expected to travel to reach a destination if the vehicle is traveling in a traveling direction a traffic lane where the roadside apparatus is installed, and the vehicle-mounted device stores the first identification information transmitted from the roadside apparatus and, if the stored first identification information is included in the second identification information transmitted from the roadside apparatus next time, reproduces content information transmitted together with the second identification information and deletes the second identification information transmitted from the roadside apparatus after reproducing the content information.

3. A vehicle-mounted device comprising:

a communication unit configured to be able to perform wireless communication with a plurality of roadside apparatuses to which identification information for identifying each of the plurality of roadside apparatuses is given, receives the identification information concerning the roadside apparatus, which is transmitted from the roadside apparatus, as first identification information, and receives, as second identification information, identification information concerning a roadside apparatus via which the vehicle is expected to travel to reach a destination if the vehicle is traveling in a traveling direction a traffic lane where the roadside apparatus is installed;

a storage unit configured to store the first identification information transmitted from the roadside apparatus;

a reproducing unit configured to reproduce content information provided from the roadside apparatus; and a control unit configured to cause, if the first identification information stored in the storage unit is included in the second identification transmitted from the roadside apparatus, the reproducing unit to reproduce content information transmitted together with the second identification information and deletes the second identification information transmitted from the roadside apparatus after reproducing the content information.

4. The vehicle-mounted device according to claim 3, wherein the control unit causes the storage unit to store and accumulate in order the first identification information transmitted from the roadside apparatus and causes, if any one kind of the first identification information stored in the storage unit is included in second identification information transmitted from the roadside apparatus next time, the reproducing unit to reproduce content information transmitted together with the second identification information.

5. The vehicle-mounted device according to claim 3, wherein the control unit deletes, if the content information transmitted from the roadside apparatus is reproduced, the first identification information stored in the storage unit and causes the storage unit to store anew the first identification information received this time.

6. The vehicle-mounted device according to claim 3, wherein the content information is traveling support information provided to be discriminated for up and down traffic lanes of a road.

7. The vehicle-mounted device according to claim 3, wherein the vehicle-mounted device does not have a navigation function and is unable to understand a location and a traveling direction of the vehicle on which the vehicle-mounted device is mounted.

* * * * *